US004001633B2

United States Statutory Invention Registration [19]

[11] Reg. Number: H1633

[45] Published: Feb. 4, 1997

Hiebert et al.

[54] DEODORIZING POLYSULFIDE MATERIALS

[75] Inventors: Gregory L. Hiebert, Mentor; Karl F. Johnson, Willoughby Hills, both of Ohio

[73] Assignee: The Lubrizol Corporation, Wickliffe, Ohio

[21] Appl. No.: 400,728

[22] Filed: Mar. 8, 1995

[51] Int. Cl.[6] ..... C08G 18/18

[52] U.S. Cl. ..... 528/373; 528/229; 528/377; 528/378; 528/480; 528/492; 528/495

[58] Field of Search ..... 528/229, 373, 528/377, 378, 480, 492, 495; 525/328.5

[56] References Cited

U.S. PATENT DOCUMENTS

| | | | |
|---|---|---|---|
| 2,384,176 | 9/1945 | Wallace et al. | 252/475 |
| 4,170,560 | 10/1979 | Lowe | 252/47.5 |
| 4,551,158 | 11/1985 | Wagner et al. | 55/46 |
| 4,690,767 | 9/1987 | DiBiase et al. | 252/47 |

*Primary Examiner*—Charles T. Jordan
*Assistant Examiner*—Meena Chelliah
*Attorney, Agent, or Firm*—John H. Engelmann; Frederick D. Hunter, Sr.

[57] ABSTRACT

A deodorized polysulfide composition, comprising a major amount of polysulfide material and a minor but effective amount of a deodorizing composition comprising an oil-soluble tertiary alkanolamine of the formula:

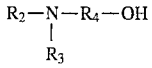

wherein $R_2$, $R_3$ and $R_4$ are independently alkyl groups of about 1 to 6 carbon atoms; and a monohydric alkyl alcohol containing up to about 12 carbon atoms is disclosed.

11 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DEODORIZING POLYSULFIDE MATERIALS

TECHNICAL FIELD OF THE INVENTION

The present invention relates to the deodorization of polysulfide materials through the treatment of these materials with a blend of an alkanolamine and an alkyl alcohol. This treatment effectively eliminates or suppresses the mercaptan, sulfide, etc. odor of polysulfide materials.

BACKGROUND OF THE INVENTION

Sulfurized polysulfide materials have been known for some time and have been considered particularly useful for applications such as metal fabricating and gear lubrication. However, it is also known that such materials have an unpleasant odor. Therefore, methods have been developed for reducing or neutralizing this odor when preparing these materials. Alkanolamines have been particularly favored for their odor reducing properties.

Amines are known to counteract the odoriferous effects of sulfurized materials in hydrocarbon materials. The amines can be used as either aqueous or oil-soluble solutions. Alkanolamines may be used for removing, neutralizing, sweetening, or scrubbing hydrocarbon gas streams. Additionally, alkanolamines may be used in conjunction with sulfurized materials, antioxidant, and for stabilizing properties. The combination of sulfurized materials and alkanolamines may be used in water-soluble cutting and grinding fluids.

A number of U.S. and foreign patents have disclosed various methods for using alkanolamines to remove sulfur-containing compounds from hydrocarbon compounds. As an example, U.S. Pat. No. 2,384,146 recognizes generally the problem of odor-causing sulfurized hydrocarbon oils and discloses the use of alkanolamines, specifically 2-amino-2-methyl-propanol, 2-aminobutanol, 2-amino-2-methyl-1,3-propanediol, 2-amino-2-ethyl- 1,3-propanediol, monoethanolamine, diethanolamine, and triethanolamine, to counteract or neutralize odor development. Another example of an amine used to purify a hydrocarbon compound is British Patent 2,167,397 which discloses the selective absorption of hydrogen sulfide from a hydrocarbon gas compound by absorption and regeneration using an alkanolamine absorbent, specifically dimethylethanolamine, ethyldiethanolamine, isopropyldiethanolamine, diisopropylethanolamine, N-ethyldiisopropanolamine, isopropyldiisopropanolamine, and N-methylmorpholine.

Alkanolamines of various types may also be water-soluble and used in aqueous solution. For example, U.S. Pat. No. 4,822,576 discloses the removal of hydrogen sulfide from a gas stream by contacting the stream with an absorbent material such as an amine, or alkanol, etc. or its aqueous solution. The preferred amine is an alkanolamine having one to 10 carbons, especially methyldiethanolamine. U.S. Pat. No. 4,545,965 relates to the selective absorption of hydrogen sulfide from gases containing carbon dioxide using a tertiary amine.

Japanese Patent JP 4139135 relates to the removal of sulfur compounds from hydrocarbon mixtures by treating the compound with N-alkyl alkanolamine and washing with water. U.S. Pat. No. 4,551,158, British Patent 2,167,397, European Patent 190434, and U.S. Pat. No. 4,545,965 disclose similar methods.

U.S. Pat. No. 4,406,868 and U.S. Pat. No. 4,741,884 disclose the removal of hydrogen sulfide from hydrocarbon gases also containing carbon dioxide by alkanolamine absorption and selective stripping.

U.S. Pat. No. 4,551,158 discloses a process in which $H_2S$ is absorbed from a gas stream using an aqueous alkanolamine solution which is regenerated.

U.S. Pat. Nos. 4,615,818 and 4,690,767, have disclosed the use of hindered amines and an optional acid anhydride or carboxylic acid to form an oil-soluble sulfurized organic composition to reduce the odor of sulfurized organic compounds.

Japanese Patent JP 2113082 discloses water-soluble cutting and grinding fluid compositions which contain an alkanolanfine, an organic sulfur compound, and an aliphatic alcohol.

U.S. Pat. No. 4,086,172 and its continuation-in-part, U.S. Pat. No. 4,170,560, discloses a lubricating oil composition which imparts improved oxidation properties in which sulfurized materials such as aromatic or alkyl sulfides and polysulfides, sulfurized olefins, sulfurized carboxylic acid esters and sulfurized ester olefins act as antioxidants and complex hydroxyalkyl amines act as stabilizers. U.S. Pat. No. 4,089,792 discloses a composition imparting improved oxidation properties in which polysulfides, sulfurized olefins and the like are stabilized by primary and substituted primary amines.

U.S. Pat. No. 4,102,796 discloses a lubricating composition containing a secondary amine in conjunction with aromatic and alkyl sulfides and polysulfides, sulfurized olefins, sulfurized carboxylic acid esters and sulfurized ester olefins. The amine and the sulfurized material composition function together as an antioxidant.

U.S. Pat. No. 4,177,153 demonstrates the use of amines and sulfurized compounds as a stabilizer in a lubricating composition and discloses a lubricating composition containing aromatic or alkyl sulfides, sulfurized olefins and the like in which a tertiary amine acts as a stabilizer. The sulfurized material is acting as an antioxidant and the tertiary amine is acting synergistically to enhance the antioxidant properties.

Although the aforementioned references generally relate to the deodorization and neutralization of sulfurized compounds or the use of amines in combination with sulfurized compounds, they do not relate to the use of an oil-soluble composition comprising a blend of a tertiary alkanolamine and an alkyl alcohol to effectively and efficiently deodorize a polysulfide material. This patent specifically relates to the use of an oil-soluble blend of a tertiary alkanolamine and an alkyl alcohol to effect the deodorization of a polysulfide material.

Accordingly, one object of the present invention is to provide a composition comprising a blend of an alkanolamine and an alkyl alcohol which deodorizes polysulfide materials.

SUMMARY OF THE INVENTION

The present invention comprises a deodorized polysulfide composition, comprising:

a major amount of polysulfide material; a minor but effective amount of a deodorizing composition consisting of an oil-soluble tertiary alkanolamine of the formula $$R_2-\underset{\underset{R_3}{|}}{N}-R_4-OH$$

wherein $R_2$, $R_3$ and $R_4$ are independently alkyl groups of about 1 to 6 carbon atoms; and a monohydric alkyl alcohol containing up to about 12 carbon atoms.

DETAILED DESCRIPTION OF THE INVENTION

According to the present invention, an oil-soluble composition is prepared comprising a blend of (i) a lower alkanolamine and (ii) an alkyl alcohol. This blend is added to polysulfide materials to reduce the level of hydrogen sulfide and organic sulfides therein, thereby reducing the odor given off.

The oil-soluble blend of alkanolamines and alkyl alcohol may be used to treat polysulfide materials containing a major proportion of sulfurized materials. The polysulfide materials contemplated by the present invention include organic polysulfides. The organic polysulfides are generally characterized as having sulfide linkages having from at least 2 to about 10 sulfur atoms, or from 2 to about 6 sulfur atoms, or from about 2 to about 4 sulfur atoms. The organic polysulfides are generally di-, tri-, or tetrasulfide compositions. The organic polysulfides may be a mixture of di-, tri-, or tetrasulfide materials. Generally the organic polysulfides contain from about 10% to about 60% sulfur, or from about 20% to about 50%, or from about 35% to about 45% sulfur. Polysulfides are generally prepared by the sulfurization of some active molecule capable of incorporating sulfur into its structure. Materials which may be sulfurized to form the organic polysulfides include oils, fatty acids or esters, or olefins, or polyolefins.

Oils which may be sulfurized are natural or synthetic oils including mineral oil, lard oil, carboxylate esters derived from aliphatic alcohols and fatty acids or aliphatic carboxylic acids, and unsaturated esters or glycerides.

Fatty acids generally contain from about 8 up to about 30 carbon atoms, or from about 12 up to about 24 carbon atoms. Examples of fatty acids include palmitoleic, oleic, ricinoleic, linoleic, oleostearic, etc. Sulfurized fatty acid esters can also be prepared from mixed unsaturated fatty acid esters such as are obtained from animal fats vegetable oils.

The olefinic materials which may be sulfurized are diverse in nature. They include those sulfurized olefins prepared by a reaction of olefinic materials with a mixture of sulfur and hydrogen sulfide in the presence of a catalyst. These materials contain at least one olefinic double bond, which is defined as a non-aromatic double bond; that is one connecting two aliphatic carbon atoms. In the broadest sense, the olefin may be defined by the formula $$R^{*1}R^{*2}C{=}CR^{*3}R^{*4}$$

wherein each $R^{*1}$, $R^{*2}$, $R^{*3}$, and $R^{*4}$ is a hydrogen or an organic group. In general, the R groups in the above formula which are not hydrogen may be satisfied by such groups as $—C(R^{*5})_3$, $—COO\ R^{*5}$, $—CON(R^{*5})_2$, $—COON(R^{*5})_4$, —COOM, —CN, —X, $—Y\ R^{*5}$, or —Ar, wherein:

each is $R^{*5}$ independently hydrogen, alkyl, alkenyl, aryl, substituted alkyl, substitutes alkenyl or substituted aryl, with the proviso that any two $R^{*5}$ groups can be alkylene or substituted alkylene whereby a ring of up to about 12 carbon atoms is formed;

M is one equivalent of a metal cation;

X is a halogen;

Y is oxygen or divalent sulfur;

Ar is an aryl or substituted aryl group of up to about 12 carbon atoms.

According to the present invention, the alkanolamines used for the treatment procedure of this invention may be monoamines or polyamines. The alkanolamines useful in this treatment procedure are oil-soluble.

The tertiary monoalkanolamines have hydrocarbyl groups each independently containing from 1, or about 2 to about 24 carbon atoms or to about 12 or to about 6 atoms in each hydrocarbyl group. In one embodiment, the hydrocarbyl group is an alkyl group. Examples of tertiary monoalkanolamines useful in the present invention include triethanolamine, methyldiethanolamine and dimethylethanolamine.

Such amines can be represented by the formulae:

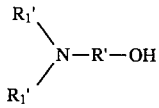

wherein each R is independently a hydrocarbyl group of about 1 to about 24 carbon atoms, and R' is a divalent hydrocarbyl group of about 2 to about 18 carbon atoms, preferably 2 to about 4. The group —R'—OH in such formulae represents a hydroxyhydrocarbyl group. R' can be an acyclic, alicylcic, or aromatic group. Typically, R' is an acyclic straight or branched alkylene group such as ethylene, 1,2-propylene, or methylene.

In one embodiment, the alkanolamines are represented by the formula

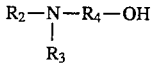

wherein $R_2$, $R_3$ and $R_4$ are each independently a hydrocarbyl group of about 1 to 6 carbon atoms. More preferably the alkanolamines have 3 to 5 carbon atoms.

The preferred alkyl alcohols for use in the treatment procedure of this invention are lower monohydric alcohols containing up to about 12 carbon atoms. Examples of alcohols used to prepare the blend for deodorization include ethanol, methanol, dodecanol, hexanol, isobutyl alcohol, 2-methylcyclohexanol, 2-ethyl hexanol, isooctanol, propanol, heptanol, undecanol, pentanol, heptanol, nonyl alcohol, and isomers thereof.

The amount of alkanolamine to alkyl alcohol used to deodorize the polysulfide material will depend on the content of the polysulfide material. Generally, a blend containing 0.25% to 0.50% alkanolamine and 1.5% to 3.0% alcohol is sufficient to effect the deodorization of the polysulfide material.

The amount of blend used to deodorize the polysulfide material will depend on the amount of sulfurized materials concentrated in said polysulfide material. Accordingly, the blend of lower alkanolamine and alkyl alcohols will be used in amounts sufficient to inhibit the evolution of odor-causing sulfurized materials in the polysulfide material. Amounts ranging from 2% to 3% of alkanolamine-alcohol blend based on the sulfide in the polysulfide material are useful. However, the preferred amounts will range from about 2.25% to 2.5% based on the weight of the sulfide in the composition.

The oil-soluble blend may be added to the polysulfide material at any stage of manufacture following sulfurization. Preferably, the blend composition is added to the polysulfide material immediately following the sulfurization operation and in advance of the settling operation.

The sulfide is treated with the blend of oil-soluble composition for a period of time, at the temperature employed, sufficient to inhibit the evolution and escape of odor of the sulfurized materials. In order to facilitate the dispersion of the blend, the polysulfide material is treated with the blend composition under moderate mixing conditions. Generally, from a few minutes to about two hours will be useful treatment periods. Preferably the sulfide solution is treated with the blend composition for a time period ranging from about 20 to 40 minutes, most preferably 30 to 35 minutes.

The temperature at which the polysulfide material is treated with the blend composition, for any specified period of time, is that sufficient to inhibit the evolution of odor in the sulfurized materials. The temperature will range from room temperature to just below the boiling point of the composition. Preferably the treatment temperature ranges from about 70° to about 170° F., preferably from about 120° F. to about 160° F., most preferably about 140° F. applied within the preferred time period stated above.

We claim:

1. A deodorized polysulfide composition, comprising:

(A) a polysulfide material;

(B) an effective amount of a deodorizing composition comprising:

(i) 0.25 to 0.5%, based on the weight of the sulfided composition, of an oil-soluble tertiary alkanolamine of the formula

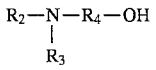

wherein $R_2$, $R_3$ and $R_4$ are independently alkyl; groups of about 1 to 6 carbon atoms; and (ii) 1.5 to 3% of a monohydric alkyl alcohol containing up to about 12 carbon atoms.

2. The composition according to claim 1 wherein said tertiary alkanolamine is dimethylethanolamine.

3. The composition according to claim 2 wherein said alkyl alcohol is a primary alcohol.

4. The composition according to claim 3 wherein said primary alcohol is 2-ethylhexanol.

5. A process for deodorizing polysulfide materials comprising the steps of:

I. mixing said materials with an oil-soluble composition comprising a blend of:

(A) 0.25 to 0.5%, based on the weight of the sulfided composition, of an oil-soluble tertiary alkanolamine of the formula:

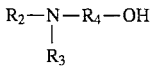

wherein $R_2$, $R_3$ and $R_4$ are independently alkyl groups of about 1 to 6 carbon atoms; and (B) 1.5 to 3% of a monohydric alkyl alcohol containing up to about 12 carbon atoms; and II. heating the mixture to a temperature from about 70° to 170° F. for a period of a few minutes to about 2 hours.

6. The process according to claim 5 wherein said alkanolamine is dimethylethanolamine.

7. The process according to claim 6 wherein said alkyl alcohol is a primary alcohol.

8. The process according to claim 7 wherein said primary alcohol is 2-ethylhexanol.

9. The process according to claim 5 wherein said polysulfide material is treated with said oil-soluble composition for a period of time ranging from 30 min. to 2 hours.

10. The process according to claim 5 wherein said polysulfide material is treated with said oil-soluble composition at a temperature ranging from about 120° to 160° F.

11. The process according to claim 5 wherein said polysulfide material is treated with said oil-soluble composition at a temperature ranging from about 140° F.

* * * * *